R. M. RUSSELL.
DRILL CHUCK.
APPLICATION FILED DEC. 17, 1907.
906,938.
Patented Dec. 15, 1908.
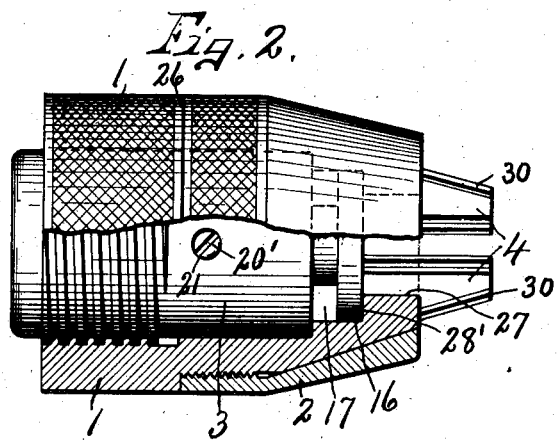
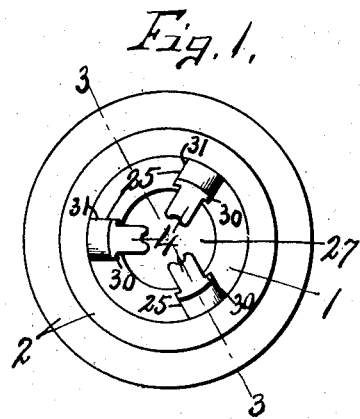
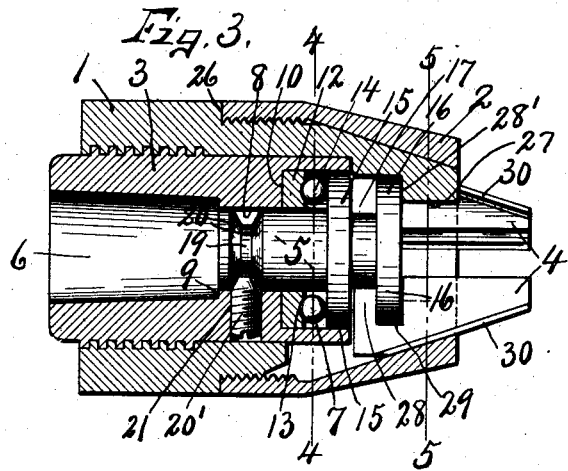
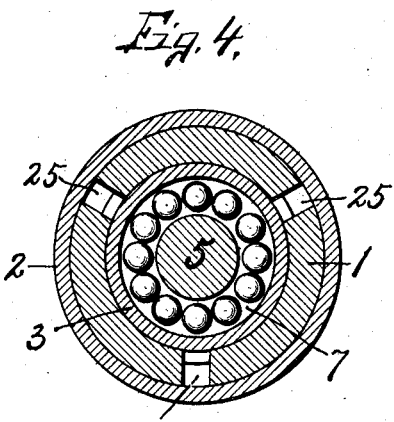
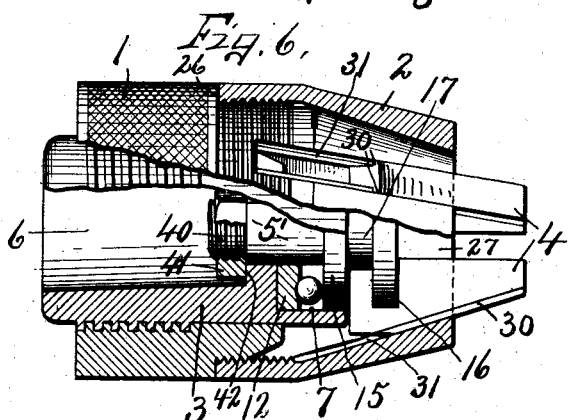
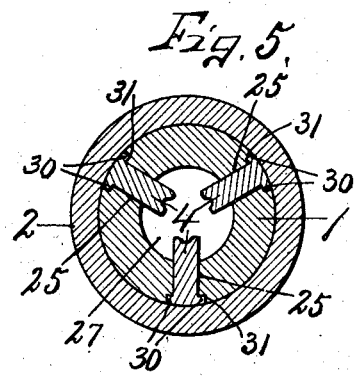
Witnesses.
Inventor.
R. M. Russell
By
Howard P. Denison
Attorney.

UNITED STATES PATENT OFFICE.

ROSS M. RUSSELL, OF ELMIRA, NEW YORK, ASSIGNOR TO RUSSELL ANTI-FRICTION DRILL CHUCK COMPANY, OF ELMIRA, NEW YORK, A CORPORATION OF NEW YORK.

DRILL-CHUCK.

No. 906,938.    Specification of Letters Patent.    Patented Dec. 15, 1908.

Application filed December 17, 1907. Serial No. 406,884.

*To all whom it may concern:*

Be it known that I, ROSS M. RUSSELL, of Elmira, in the county of Chemung, in the State of New York, have invented new and useful Improvements in Drill-Chucks, of which the following, taken in connection with the accompanying drawings, is a full, clear, and exact description.

This invention relates to certain improvements in drill chucks of the class set forth in my Patent No. 539,193, issued May 14, 1895, and refers more particularly to the means by which the movable jaws and retaining means therefor are operatively mounted in the rotary head.

In this particular device the chuck comprises an outer casing, threaded upon an inner head consisting of sections having antifrictional bearings between them, one of which sections engages the jaws to reciprocate the latter endwise within the casing with which the jaws are slidably interlocked.

One of the essential objects of my present invention is to increase the efficiency and durability of the chuck by reducing the number of parts, at the same time facilitating the assemblage of such parts and materially reducing the cost of manufacture of the completed chuck.

Another object is to provide means for taking up the wear between the anti-friction bearings, and at the same time to utilize such means for retaining the head sections in operative relation to each other.

Other objects and uses will be brought out in the following description.

In the drawings—Figure 1 is an end view. Fig. 2 is a side elevation, partly in section, of a drill chuck embodying the various features of my invention. Figs. 3, 4 and 5 are sectional views taken respectively on lines 3—3, Fig. 1, and 4—4, and 5—5—, Fig. 3. Fig. 6 is a sectional view, partly in elevation, of a modified form of drill chuck.

In carrying out the objects stated, I provide an outer casing composed of tubular sections 1— and —2— for inclosing an inner head —3— and a series of movable jaws —4— which are operatively connected to the head —3— through the medium of a separately rotatable auxiliary head —5—. The head —3— is provided at one end with a tapering socket —6— while its other end is formed with a cylindrical socket —7—, which is connected to the socket —6— by an opening —8—, of somewhat smaller diameter than the socket —7— and small end of the tapering socket —6—, thereby forming opposite annular shoulders —9— and 10—, the shoulder 9— forming a limiting stop to prevent undue inward movement of the drill spindle, or other tapering rotary member, upon which the chuck is frictionally mounted, while the shoulder —10— forms a suitable seat, or stop for a bearing plate or washer 12— which is placed in the base of the socket —7—. This plate or wearing ring 12— is provided with an annular groove 13— in its outer face forming a convenient race-way for a series of anti-friction balls 14—, the latter being located between the bearing plate or washer 12— and a corresponding annulus 15— integral with the auxiliary head 5—. This head —5— is provided at its outer end with a second annulus 16—, spaced some distance apart from the annulus 15—, forming an intervening annular groove 17— for the reception of the inner ends of the jaws —4—. The opposite end of the auxiliary head —5— is also formed with an annular groove 19— having beveled sides —20— one of which is engaged by the inner tapering end of an adjusting screw —20'—, the latter being screwed in a threaded opening 21— in one side of the head —3— so as to lie wholly within the periphery thereof when adjusted for use. The diameter of the inner tapering end of the screw —20'— is somewhat less than the distance between the bevel faces —20— and said tapering end of the screw is positioned so as to engage the beveled face nearest the adjacent end of the head, leaving a slight clearance between the opposite side of the screw and adjacent bevel face so as to allow a limited inward movement of the screw to adjust the auxiliary head 5— for the purpose of taking up the wear at the anti-friction bearings; said screw also serving to hold the auxiliary head against endwise displacement.

The jaws —4— are movable lengthwise, or axially of the chuck in suitable slots or ways —25—, which are spaced a uniform distance apart circumferentially and extend inwardly from the advance end of the casing section —1—, a distance substantially equal to the length of the jaws —4—, and in this particular instance about equal to half the length of the casing section —1—. This slotted end of the casing section —1— is tapered, and is of less diameter than the opposite end forming an annular shoulder —26—, the portion of the periphery of the sleeve section —1— immediately in front of the shoulder —26— being threaded for receiving the adjacent end of the sleeve section —2—, which is also threaded interiorly and screwed upon the section —1— until its rear or upper end face abuts against the shoulder —26.

The diameters of the two sections —1— and —2— are substantially equal at their junctions one with the other, and the peripheries of both sections are preferably knurled or roughened to afford a suitable hand-grip, whereby they may be rotated relatively to each other. The lower or front end of the case-section —2— is also tapered externally and internally, the inner taper fitting closely upon the tapering face of the inner section —1— so that when the part —2— is screwed upon the part —1— they form practically a unitary sleeve or casing for partially retaining and guiding the jaws. The outer end of the inner section —1— is formed with a somewhat reduced central opening —27— for receiving the drill or other tool and the jaws —4— are movable radially in this opening, as the sleeve sections —1— and —2— are screwed or unscrewed upon the head —3—, it being understood that the sleeve —1— is threaded interiorly and engaged with peripheral threads on the spindle head —3—. The reduced end of the sleeve —1— forms a shoulder —28′— forming an abutment for the adjacent annulus 16— to prevent outer displacement or undue endwise movement of the auxiliary head —5—. The inner ends of the jaws —4— are formed with radially projecting flanges —28— and grooves 29—, the flanges —28— entering the space between the annuli 15— and 16—, while the annulus 16— enters the grooves —29—, thereby establishing a lock between the auxiliary head —5— and jaws, and affords means whereby the jaws are held in fixed axial relation to the head—3—. The outer faces of these jaws are coincident with the front tapering face of the casing section —1— and are, therefore, engaged by the inner tapering bearing face of the casing section —2—, said jaws being provided along their longitudinal outer edges with opposite flanges —30— which ride in grooves —31— in the periphery of the casing-section —1— to prevent inward displacement of the jaws and to keep their gripping faces uniform distances from the center or axis of the chuck.

In assembling the parts of this chuck the bearing washer 12— is placed in the base of the socket —7— of a spindle head —3— so as to lie flat against the shoulder 10—, after which the balls 14— are placed in the groove 13— and the auxiliary head —5— is then inserted into the opening —8— and through the washer 12— until the inner face of the annulus 15— engages the balls 14—, whereupon the screw —20— is tightened for adjusting and holding the auxiliary head —5— in operative position within the spindle head —3—, the outer end of said adjusting screw —20— being within the periphery of the spindle head. After the head sections —3— and 5— are thus connected or assembled together, the casing section —1— is screwed upon the spindle head —3—, and the jaws —4— are then placed in the slots —25— and engaged with the annulus 16—, thereby locking the jaws to the head —5—, after which the casing section —2— is screwed upon the section —1— to hold the jaws —4— against outward displacement, thus completing the chuck ready for use.

The particular feature of the construction shown in Figs. 1 to 5 inclusive, however, is the means by which the auxiliary head —5— is held in place and adjusted to take up wear of the anti-friction bearing, another feature of advantage being that the socket —7— is formed directly in one end of the spindle head —3—, while the annuli 15— and 16— are formed directly upon the auxiliary head —5—, thereby reducing the number of parts and enabling the head sections to be quickly and easily assembled.

In Fig. 6 I have shown a modified construction of holding and adjusting means for an auxiliary head 5′—, which, together with the other parts of the chuck are very similar to that shown in Figs. 1 to 5 inclusive, except that the inner end of the auxiliary head 5′ is threaded at —40— for receiving a nut —41—, which engages the annular bearing face —42— at the end of the spindle socket —6—, and not only serves to lock the auxiliary head 5′ in position, but also serves to adjust said auxiliary head to take up wear at the anti-friction bearing. The purpose of these anti-friction bearings is to prevent a relative end thrust of the head sections —3— and —5— and at the same time to render the rotation of the casing section —1— easier in clamping and releasing the jaws to and from the drill or other tool adapted to be held thereby.

What I claim is:

1. In a drill chuck, an externally threaded head having a cylindrical socket extending inwardly from one end, and a central opening of smaller diameter than the socket forming an annular shoulder at the base of the socket, a separately rotatable auxiliary head journaled in said opening and provided with annular flanges spaced apart and of greater diameter than the opening, anti-friction balls, between one of said flanges and shoulder, means for preventing endwise movement of the auxiliary head relatively to the first named head, radially movable jaws having grooves receiving the other flange and provided with tongues entering the space between said flanges, and an internally threaded casing screwed upon the externally threaded head and engaging said jaws for opening and closing the jaws as the casing is rotated on the externally threaded head.

2. In a drill chuck, an externally threaded head having a cylindrical socket in one end and provided with a central opening and of less diameter than the cylindrical socket, an auxiliary head journaled in the said central opening, and provided with annular flanges spaced apart forming an intervening annular groove, means for holding the auxiliary head against lengthwise movement in the externally threaded head, one of said annular flanges fitting in the cylindrical socket, jaws having grooves receiving the other flange and provided with tongues projecting into the groove between said flanges, and an internally threaded casing screwed upon the externally threaded head and provided with means for moving the jaws radially as the casing is rotated upon said externally threaded head.

In witness whereof I have hereunto set my hand this 2nd day of December, 1907.

ROSS M. RUSSELL.

Witnesses:
WALLACE W. SEELEY,
JOHN M. McDOWELL.